(12) United States Patent
Witter et al.

(10) Patent No.: US 6,449,702 B1
(45) Date of Patent: Sep. 10, 2002

(54) MEMORY BANDWIDTH UTILIZATION THROUGH MULTIPLE PRIORITY REQUEST POLICY FOR ISOCHRONOUS DATA STREAMS

(75) Inventors: Todd M. Witter, Orangevale; Aditya Sreenivas, El Dorado Hills; Sam Jensen, Fair Oaks, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,732

(22) Filed: Dec. 30, 1999

(51) Int. Cl.[7] ................................. G06F 12/16
(52) U.S. Cl. .................. 711/158; 711/151; 711/156; 711/219
(58) Field of Search .................. 711/109, 110, 711/134, 151, 156, 158, 167, 169, 219; 710/52, 107, 113, 240, 241, 244, 40, 53, 100, 20; 713/600

(56) References Cited

U.S. PATENT DOCUMENTS

| | | | | |
|---|---|---|---|---|
| 4,616,338 A | * | 10/1986 | Helen et al. .................. 710/53 |
| 4,815,039 A | * | 3/1989 | Tai et al. ................. 365/189.07 |
| 5,371,893 A | * | 12/1994 | Price et al. .................. 710/241 |
| 5,432,919 A | * | 7/1995 | Falcone et al. .............. 711/134 |
| 5,673,416 A | * | 9/1997 | Chee et al. .................. 345/535 |
| 5,758,105 A | * | 5/1998 | Kelley et al. ................ 710/113 |
| 5,778,218 A | * | 7/1998 | Gulick ........................ 713/503 |
| 5,794,073 A | * | 8/1998 | Ramakrishnan et al. ...... 710/40 |
| 5,796,961 A | * | 8/1998 | O'Brien ....................... 710/107 |
| 5,805,905 A | * | 9/1998 | Biswas et al. ............... 710/244 |
| 5,845,152 A | * | 12/1998 | Anderson et al. ............. 710/52 |
| 5,854,638 A | * | 12/1998 | Tung ........................... 345/542 |
| 5,860,119 A | * | 1/1999 | Dockser ....................... 711/156 |
| 5,881,248 A | * | 3/1999 | Mergard ...................... 710/100 |
| 5,903,283 A | * | 5/1999 | Selwan et al. ............... 345/535 |
| 5,983,301 A | * | 11/1999 | Baker et al. ................. 710/113 |
| 5,991,304 A | * | 11/1999 | Abramson .................... 370/413 |
| 6,076,125 A | * | 6/2000 | Anand ......................... 710/107 |
| 6,091,431 A | * | 7/2000 | Saxena et al. ............... 345/535 |
| 6,101,613 A | * | 8/2000 | Garney et al. ............... 713/600 |
| 6,105,086 A | * | 8/2000 | Doolittle et al. .............. 710/52 |
| 6,134,625 A | * | 10/2000 | Abramson .................... 710/241 |
| 6,154,800 A | * | 11/2000 | Anand ......................... 710/107 |
| 6,192,428 B1 | * | 2/2001 | Abramson et al. ............ 710/52 |
| 6,247,071 B1 | * | 6/2001 | Cardoso, Jr. ................. 710/52 |

* cited by examiner

*Primary Examiner*—David Hudspeth
*Assistant Examiner*—Fred F. Tzeng
(74) *Attorney, Agent, or Firm*—Calvin E. Wells

(57) ABSTRACT

An embodiment of a system logic device for improving memory bandwidth utilization in a computer system with an isochronous data stream includes a FIFO for the isochronous data stream. The FIFO includes two watermarks. When the data level of the FIFO falls below a first watermark level, a low priority request is issued to a memory controller. If the data level of the FIFO falls below a second watermark level, a high priority memory request is issued to the memory controller. The low priority memory request is assigned the lowest priority level by the memory controller. The high priority request is assigned the highest priority level by the memory controller. The low priority request allows the isochronous data stream to retrieve small amounts of data from memory without negatively impacting overall system performance while the high priority request allows the isochronous data stream to retrieve larger amounts of data from memory within a fixed time in order to ensure that the FIFO never completely drains.

19 Claims, 4 Drawing Sheets

MEMORY BANDWIDTH UTILIZATION THROUGH MULTIPLE PRIORITY REQUEST POLICY FOR ISOCHRONOUS DATA STREAMS

FIELD OF THE INVENTION

The present invention pertains to the field of computer systems. More particularly, this invention pertains to the field of improving memory bandwidth utilization in systems that include isochronous data streams.

BACKGROUND OF THE INVENTION

An important function of computer systems is that of processing isochronous data streams. Isochronous data streams are those data streams that have strict throughput and latency requirements. An example of one such data stream is a data stream for a video display device. Video display devices require a certain amount of data every fixed period. If the required data is not delivered to the video display device at the required rate and within the required time period, then some form of display corruption will result.

Isochronous data streams typically have very even data consumption rates, that is, for a given period of time, the amount of data consumed will always be the same. Memory access, on the other hand, is typically very uneven due to arbitration with other data streams. For example, when a video display device requires data it must arbitrate for access to memory with other system resources. The result is uneven and unpredictable access to memory. Another issue with isochronous data streams is that an isochronous data stream is likely to operate at a different clock frequency than that of the memory subsystem. These two issues can be solved by using an intermediate storage first-in, first-out buffer (FIFO). The FIFO can accept data from memory at whatever rate the memory can deliver the data and the FIFO can output data at the rate required by the isochronous data stream.

The FIFO technique works so long as the FIFO is never allowed to go empty. If the FIFO goes empty at any point, the isochronous data stream will be corrupted. To help prevent this situation, isochronous data streams are typically assigned the highest priority for arbitrating access to memory.

In order to maximize memory efficiency, the requests for data are typically made as large as possible. Because for an isochronous data stream the memory access latency, memory data rate, FIFO size, and FIFO drain rate are known, a maximum request size can be calculated as well as the FIFO data level at which the request must occur. This data level may be referred to as a "watermark". When the data level of the FIFO falls below the watermark level, a request is made to a memory arbiter for access to memory. Typically, this request will be allowed to interrupt other ongoing memory transactions in order to ensure that the FIFO receives data within the required time. While the technique of allowing the isochronous data stream memory request to interrupt other memory transactions ensures that the isochronous data stream receives data at a satisfactory rate, the interruptions result in latency penalties for other computer system functions and overall computer system performance is negatively affected.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An embodiment of a system logic device for improving memory bandwidth utilization in a computer system with an isochronous data stream includes a FIFO for the isochronous data stream. The FIFO includes two watermarks. When the data level of the FIFO falls below a first watermark level, a low priority request is issued to a memory controller. If the data level of the FIFO falls below a second watermark level, a high priority memory request is issued to the memory controller. The low priority memory request is assigned the lowest priority level by the memory controller. Therefore, the low priority requests from the isochronous data stream will only utilize memory bandwidth that would otherwise go unused. The high priority request, on the other hand, is assigned the highest priority level by the memory controller. The high priority request is allowed to interrupt ongoing transactions from other data streams. Therefore, the isochronous stream is assured of receiving prompt service from the memory controller and the FIFO is never allowed to reach an empty state. The low priority request allows the isochronous data stream to retrieve small amounts of data from memory without negatively impacting overall system performance while the high priority request allows the isochronous data stream to retrieve larger amounts of data from memory in a hurry in order to ensure that the FIFO never goes empty. Further, the utilization of the first watermark and its associated low priority memory request will result in fewer high priority requests being issued by the isochronous data stream, thereby improving memory efficiency and improving overall system performance.

Figure 1:
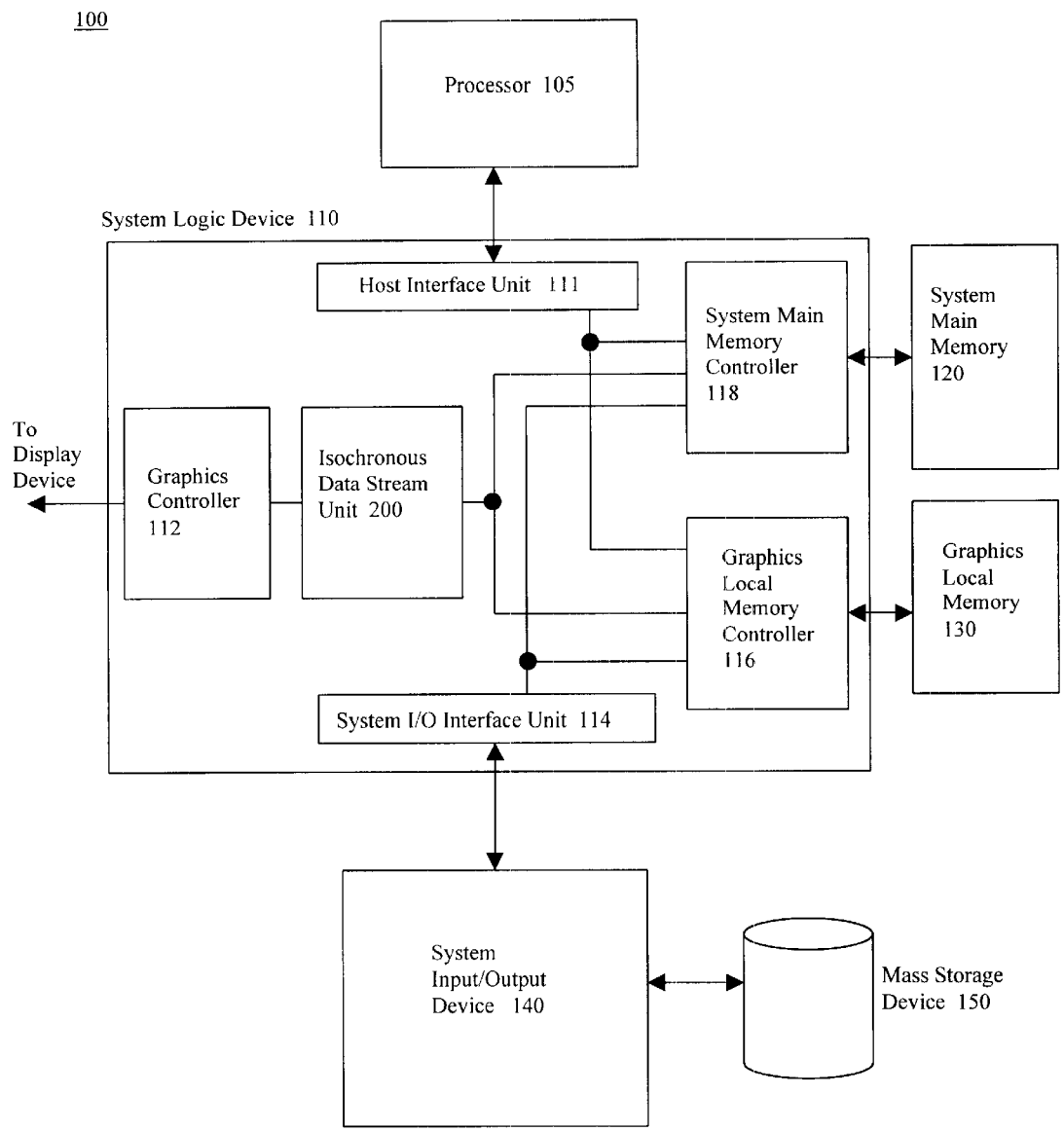
FIG. 1 is a block diagram of a computer system that includes a system logic device configured in accordance with an embodiment of the invention.

FIG. 1 shows a block diagram of a computer system 100 that includes a system logic device 110. The system logic device 110 is coupled between a processor 105 and a system input/output device 140. The system logic device 110 is also coupled to a display device (not shown) and a system main memory 120 and a graphics local memory 130. The graphics local memory 130 is optional, as part of the system main memory 120 may be used as a graphics memory. Whether graphics memory resides at graphics local memory 130 or as part of system main memory 120 may be implemented as a programmable feature.

The system logic device 110 includes a host interface unit 111 to facilitate communication with the processor 105 and a system I/O interface 114 to allow communication with the system input/output device 140. The system logic device 110 further includes a system main memory controller 118 coupled to system main memory 120 and a graphics local memory controller 116 coupled to the graphics local memory 130.

Also included in the system logic device 140 is an isochronous data stream unit 200 coupled between a graphics controller 112 and the system main memory controller 118 and the graphics local memory controller 116. The isochronous data stream unit 200 serves to deliver data from either the system main memory controller 118 or the graphics local memory controller 116 to the graphics controller 112 under strict throughput and latency requirements.

The system main memory controller 118 and the graphics local memory controller 116 receive data transfer requests from the host interface unit 111 and the system I/O interface unit 114, as well as from the isochronous data stream unit 200. The system main memory controller 118 and the graphics local memory controller 116 each include an arbiter (not shown) to arbitrate access to the system main memory 120 or the graphics local memory 130.

Figure 2:
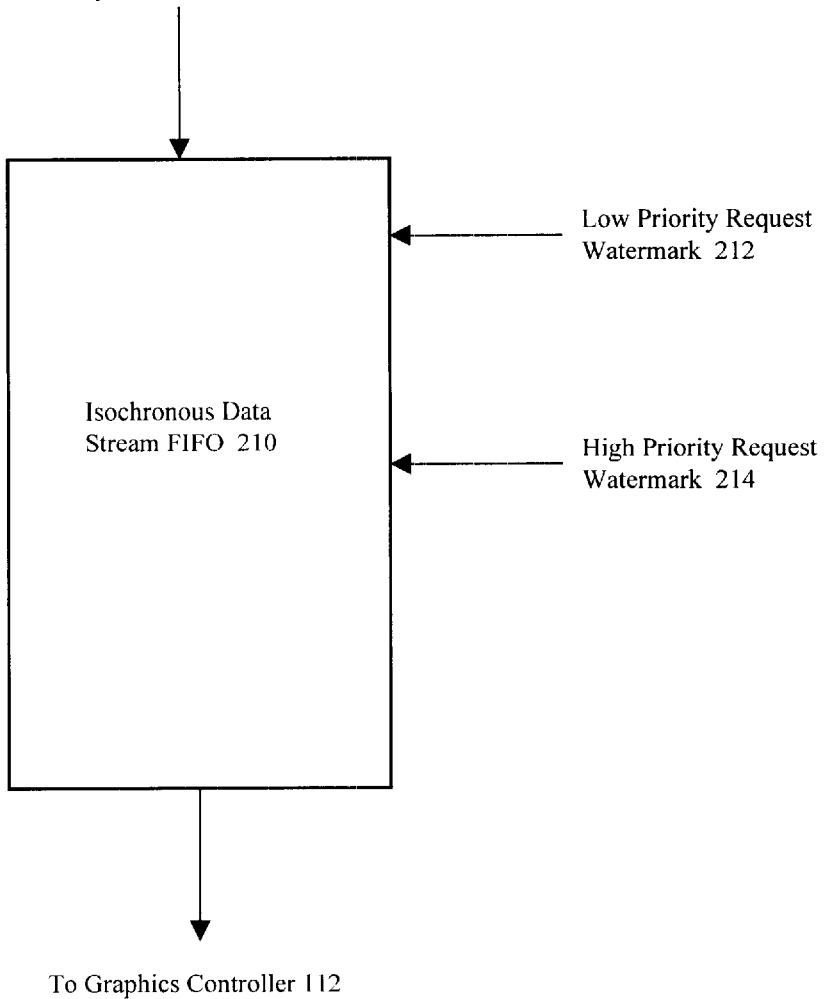
FIG. 2 shows a block diagram of part of an isochronous data stream unit including a FIFO where the FIFO implements a low priority watermark and a high priority watermark.

FIG. 2 depicts part of the isochronous data stream unit 200. The isochronous data stream unit 200 includes an isochronous data stream FIFO 210 that receives data from either the system main memory controller 118 or the graphics local memory controller 116 and delivers data to the graphics controller 112. For this example embodiment, the isochronous data stream unit 200 is tasked with delivering video display data to the graphics controller 112 for display on the display device.

The isochronous data stream unit 200 includes a low priority request watermark 212 and a high priority request watermark 214. The term "watermark" as used herein is intended to include any means of indicating a particular data level for the FIFO 210. The low priority request watermark 212 and the high priority request watermark 214 may be programmable. For this example embodiment, the low priority request watermark 212 is set to represent a data level where the FIFO 210 has 64 bytes of empty storage space. Also for this example embodiment, the high priority request watermark 214 is set to represent a data level where the FIFO 210 has 512 bytes of empty storage space.

When the data level of the FIFO falls below the level of the low priority request watermark 212, a low priority memory request is issued by the isochronous data stream unit 200 to either the system main memory controller 118 or the graphics local memory controller 116, depending on where the video display data is stored. The low priority request is for 64 bytes of data in this example. The system main memory controller 118 and the graphics local memory controller 116 assign to the low priority memory request from the isochronous data stream unit 200 an arbitration priority level lower than that of all other memory access requests. In this manner, the isochronous data stream unit 200 can receive 64 bytes of data at a time without interrupting other data streams or negatively impacting overall system performance.

In the event that the low priority request from the isochronous data stream unit 200 is not timely responded to by the either the system main memory controller 118 or the graphics local memory controller 116, the FIFO 210 data level may fall below the high priority request watermark 214. As a result of the FIFO 210 data level falling below the high priority request watermark 214, a high priority memory access request is issued to either the system main memory controller 118 or the graphics local memory controller 116, depending on where the video display data is stored. The high priority request in this example is for 512 bytes of display data. The system main memory controller 118 and the graphics local memory controller 116 assign to the high priority request from the isochronous data stream unit 200 a priority level higher than that of any other memory access request. Further, the high priority request in this example embodiment is allowed to interrupt any other memory access transaction. In this manner, the FIFO 210 is ensured of receiving data before it goes empty which would result in the FIFO 210 being unable to continue to provide valid data to the graphics controller 112. In the case where the low priority request goes unserviced and the high priority request watermark 214 level is crossed, the low priority request is merged with the high priority request.

By issuing a low priority request whenever the FIFO 210 data level falls below the low priority watermark 212, the data level of the FIFO 210 will fall below the high priority request watermark less often than in the case where a single high priority watermark is used, resulting in fewer interruptions of other memory access transactions and thereby improving memory bandwidth utilization and overall system performance.

Figure 3:
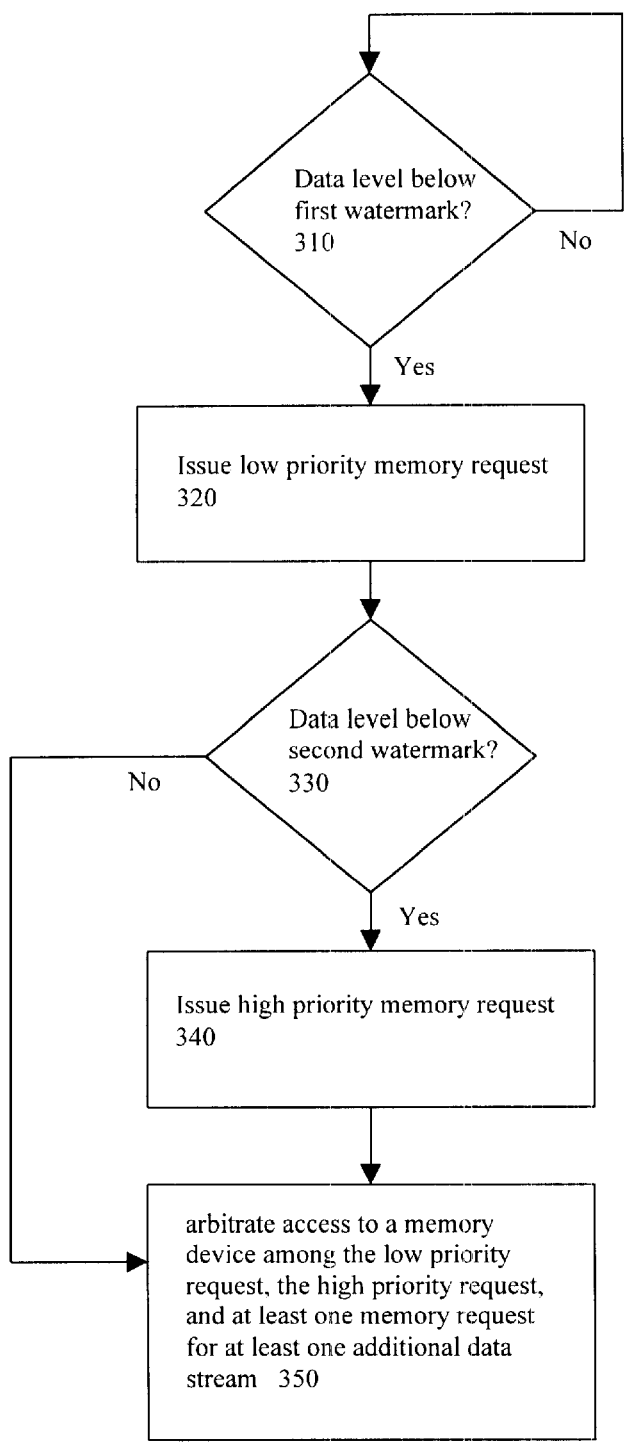
FIG. 3 is a flow diagram of an embodiment for improving memory bandwidth utilization using a multiple priority request policy for an isochronous data stream.

FIG. 3 is a flow diagram of an embodiment of a method for improving memory bandwidth utilization using a multiple priority request policy for an isochronous data stream. At step 310, a determination is made as to whether the data level of a FIFO in an isochronous data stream has fallen below a first watermark level. If the data level has not fallen below the first watermark level, then step 310 is repeated. If, however, the data level falls below the first watermark level at step 310, then at step 320 a low priority memory request is issued to a memory controller. In one embodiment, the low priority request is assigned an arbitration priority level lower than that of any other memory access request.

At step 330, a determination is made as to whether the data level has fallen below a second watermark. This may be the case where the low priority request issued in step 320 goes unserviced for a period of time. If the data level has not fallen below the second watermark level at step 330, then at step 350 arbitration occurs for access to a memory device. If, however, the data level falls below the second watermark level at step 330, then at step 340 a high priority request is issued to the memory controller. In one embodiment, the high priority request is assigned an arbitration priority level higher than that of any other memory access request. Following step 340, arbitration for access to the memory device occurs at step 350.

Figure 4:
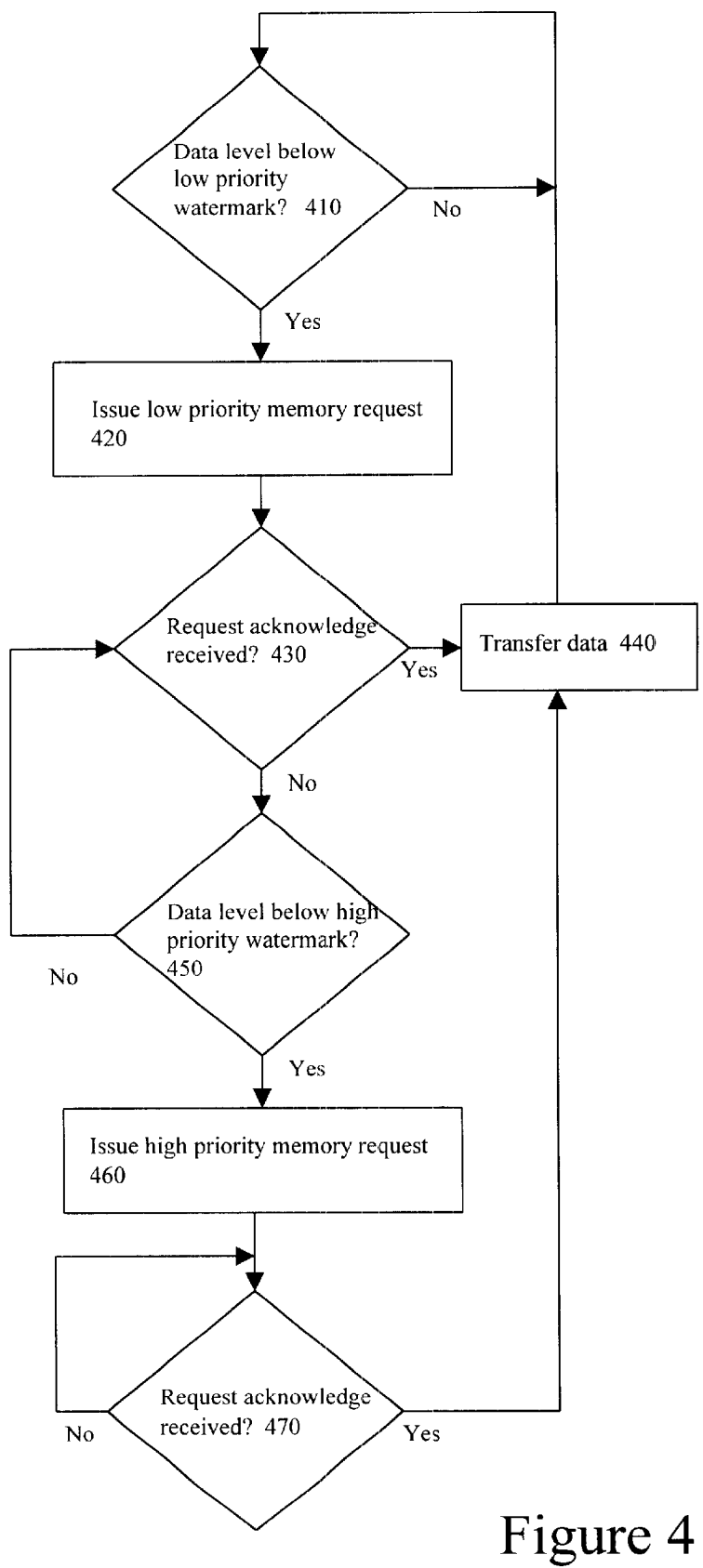
FIG. 4 is a flow diagram of an additional embodiment for improving memory bandwidth utilization using a multiple priority request policy for an isochronous data stream.

FIG. 4 is a flow diagram of an additional embodiment of a method for improving memory bandwidth utilization using a multiple priority request policy for an isochronous data stream. At step 410, a determination is made as to whether the data level for an isochronous data stream FIFO has fallen below a low priority watermark level. If the data level has not fallen below the low priority watermark level, then step 410 is repeated. If, however, the data level has fallen below the low priority watermark level at step 410, then a low priority memory request is issued to a memory controller at step 420. The low priority memory request is assigned an arbitration priority level lower than that of all other memory access requests. If at step 430 a request acknowledge is received for the low priority request from the memory controller, then at step 440 data is transferred from the memory controller to the isochronous data stream FIFO. The data transfer for the low priority request is relatively small, perhaps 64 bytes in length.

If, however, the request acknowledge is not received at step 430, then a determination is made at step 450 as to whether the FIFO data level has fallen below a high priority watermark level. If the data level has not fallen below the high priority watermark level, then step 430 is repeated. If, however, the data level has fallen below the high priority watermark at step 450, then a high priority memory request is issued to the memory controller at step 460. The high priority request is assigned an arbitration priority level higher than that of all other memory access requests. At step 470, a determination is made as to whether a request acknowledge for the high priority request has been received. If the request acknowledge has not been received, then step 470 is repeated. If the request acknowledge is received at step 470, then a data transfer occurs at step 440. The data transfer for the high priority request is larger than that for the low priority request, perhaps 512 bytes in length.

Although the embodiments described above in connection with FIGS. 1 through 4 discuss an isochronous data stream of video data, other embodiments are possible with other types of isochronous data streams. Further, embodiments that include watermark levels, data transfer sizes, and arbitration schemes other than those discussed above are possible.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An apparatus, comprising:
    a data queue for an isochronous data stream, the data queue to trigger a low priority memory request in response to a data level of the queue falling below a first watermark level and the data queue further to trigger a high priority memory request in response to the data level of the queue falling below a second watermark level; and
    an arbiter to receive the low priority and high priority memory requests and to receive at least one memory request for at least one additional data stream, the arbiter to arbitrate access to a memory device, the arbiter assigning to the low priority memory request a priority level lower than that of all other requests.

2. The apparatus of claim 1, the first watermark level to represent a data level higher than that of the second watermark level.

3. The apparatus of claim 2, wherein the high priority memory request is assigned a priority higher than that of all other memory requests.

4. The apparatus of claim 3, wherein the memory device is a graphics local memory device.

5. The apparatus of claim 3, wherein the memory device is a system main memory device.

6. The apparatus of claim 3, wherein the first watermark represents a data level of 64 bytes of storage locations available in the data queue.

7. The apparatus of claim 6, wherein the second watermark represents a data level of 512 bytes of storage locations available in the data queue.

8. A method, comprising:
    issuing a low priority memory request in response to a data level of a data queue for an isochronous data stream falling below a first watermark level;
    issuing a high priority memory request in response to the data level of the data queue for an isochronous data stream falling below a second watermark level;
    assigning to the low priority memory request a priority level lower than that of all other requests; and
    arbitrating access to a memory device among the low priority request, the high priority request, and at least one memory request for at least one additional data stream.

9. The method of claims 8, the first watermark level to represent a data level higher than that of the second watermark level.

10. The method of claim 9, further comprising assigning the high priority memory request a priority higher than that of all other memory requests.

11. The method of claim 10, wherein arbitrating access to a memory device includes arbitrating access to a graphics local memory device.

12. The method of claim 10, wherein arbitrating access to a memory device includes arbitrating access to a system main memory device.

13. The method of claim 10, wherein the first watermark represents a data level of 64 bytes of storage locations available in the data queue.

14. The method of claim 13, wherein the second watermark represents a data level of 512 bytes of storage locations available in the data queue.

15. A system, comprising:
    a memory device; and
    a system logic device coupled to the memory device, the system logic device including
        a data queue for an isochronous data stream, the data queue to trigger a low priority memory request in response to a data level of the queue falling below a first watermark level and the data queue further to trigger a high priority memory request in response to the data level of the queue falling below a second watermark level, and
        an arbiter to receive the low priority and high priority memory requests and to receive at least one memory request for at least one additional data stream the arbiter to arbitrate access to the memory device, the arbiter assigning to the low priority memory request a priority level lower than that of all other requests.

16. The system of claim 15, the first watermark level to represent a data level higher than that of the second watermark level.

17. The system of claim 16, wherein the high priority memory request is assigned a priority higher than that of all other memory requests.

18. The system of claim 17, wherein the memory device is a graphics local memory device.

19. The system of claim 17, wherein the memory device is a system main memory device.

* * * * *